United States Patent [19]

Nerone et al.

[11] Patent Number: 5,059,867
[45] Date of Patent: Oct. 22, 1991

[54] BALLAST CIRCUIT WITH IMPROVED TRANSFER FUNCTIONS

[75] Inventors: Louis R. Nerone, Brecksville; Michael M. Secen, Mentor; Michael M. Minarczyk, North Royalton, all of Ohio

[73] Assignee: General Electric Company, Schenectady, N.Y.

[21] Appl. No.: 505,100

[22] Filed: Apr. 3, 1990

[51] Int. Cl.⁵ .......................................... H05B 41/26
[52] U.S. Cl. ................................. 315/247; 315/242; 315/289; 315/290; 315/DIG. 2; 315/DIG. 7
[58] Field of Search ......... 315/247, 289, 290, DIG. 7, 315/242, DIG. 5, DIG. 2

[56] References Cited

U.S. PATENT DOCUMENTS

| | | | |
|---|---|---|---|
| 3,890,537 | 6/1975 | Park et al. | 315/247 X |
| 3,913,002 | 10/1975 | Steigerwald et al. | 315/247 X |
| 4,161,672 | 7/1979 | Cap et al. | 313/220 |
| 4,415,837 | 11/1983 | Sodini | 315/289 X |
| 4,494,045 | 1/1985 | Davenport | 315/247 |
| 4,567,404 | 1/1986 | Flugan | 315/DIG. 7 X |
| 4,572,988 | 2/1986 | Handler et al. | 315/DIG. 7 X |
| 4,626,745 | 12/1986 | Davenport et al. | 315/179 |
| 4,678,968 | 7/1987 | Lester | 315/290 |
| 4,806,830 | 2/1989 | Ueki | 315/247 X |
| 4,916,364 | 4/1990 | Collins | 315/DIG. 2 X |
| 4,945,278 | 7/1990 | Chern | 315/DIG. 2 X |
| 4,952,847 | 8/1990 | Lin et al. | 315/DIG. 2 X |

*Primary Examiner*—Eugene R. LaRoche
*Assistant Examiner*—Do Hyun Yoo
*Attorney, Agent, or Firm*—George E. Hawranko; John P. McMahon; Fred Jacob

[57] ABSTRACT

A ballast circuit for operating a metal halide lamp by applying DC excitation during its start, glow and run modes is disclosed. The type and values of the circuit components of the ballast circuit are selected to provide automatic, sequential and desired transfer functions as the impedance value of the metal halide lamp transitions from its value occurring during the start, glow and run modes of operation. The ballast circuit has an input stage that is easily adapted to present a high power factor to the AC power source supplying the metal halide lamp. Further, the ballast circuit generates a signal for more easily starting the lamp and having a relatively high DC level upon which are developed pulse signals.

11 Claims, 5 Drawing Sheets

EXPRESSIONS (3) AND (4)

$$R_2 = \frac{\pi^2}{8} R\ell \quad (3)$$

WHERE $R\ell$ IS THE ASSUMED LAMP RESISTANCE DURING THE RUN MODE.

$$G_1(j\omega) = \frac{1}{\sqrt{\left[1-\left(\frac{\omega}{\omega_n}\right)^2\right]^2 + \left(2\varepsilon\frac{\omega}{\omega_n}\right)^2}} \triangleq \frac{V_2(j\omega)}{V_1(j\omega)} \quad (4)$$

WHERE $\varepsilon \cong \frac{1}{2} \sqrt{\dfrac{R_1^2}{L_1/C_2} + \dfrac{L_1/C_2}{R_2^2}}$  ASSUMING $R_1 \ll R_2$ $$\omega_n = \sqrt{\frac{1}{L_1 C_2}}$$

$\omega = 2\pi \cdot 60 = 377\, r/s$
WHERE $r/s$ = RADIANS/SECOND

EXPRESSIONS (5) AND (6)

$$G_2(j\omega) \triangleq \frac{I(j\omega)}{V_1(j\omega)} = \frac{(j\omega + 2\varepsilon\omega_n)\left(\frac{\omega_n}{Z_0}\right)}{j\,2\varepsilon\omega_n\omega + (\omega_n^2 - \omega^2)} \quad (5)$$

WHERE $Z_0 = \sqrt{\dfrac{L_1}{C_2}}$ $$\Sigma = \frac{\sqrt{\dfrac{L_1}{C_2}}}{2R_2}$$

$$\omega_n = \frac{1}{\sqrt{L_1 C_2}}$$

GIVEN: $\omega = 377\, r/s$ = CONSTANT (LINE FREQUENCY)
$Z_0 = 500$
$\omega_n = 500$
$V_1 = 120\,V.$

THEN; SUBSTITUTING INTO EXPRESSION (5) YIELDS:

$$I(\varepsilon) = \frac{(j377 + 1000\varepsilon)\sqrt{2} \cdot 100}{(500^2 - 377^2) + j5 \cdot 10^5 \varepsilon} \quad (6)$$

IF $\varepsilon = 0.71$ THEN PHASE ANGLE $\theta = 45°$

Fig. 6

$\theta(\varepsilon)$ $\varepsilon = 0.71$ (RUN MODE DAMPING RATIO)

Fig. 7

BALLAST CIRCUIT WITH IMPROVED TRANSFER FUNCTIONS

BACKGROUND OF THE INVENTION

The present invention relates to a power circuit that supplies DC excitation to a gas discharge lamp. More particularly, the present invention relates to a ballast circuit that automatically and sequentially provides desired transfer functions for the DC operation of the metal halide lamp.

The ballast circuit having its desired transfer functions provides the necessary voltage and current conditions to the gas discharge lamp, such as a metal halide lamp, so that it properly performs during its various modes of operation which are; (1) an initial high voltage breakdown or start mode; (2) a glow-to-arc transition or glow mode; and (3) a steady state, arc or run mode. Each of these modes have different voltage and current requirements allowing the gas discharge lamp to perform in a proper manner. It is desired that these various current and voltage requirements be provided in an automatic and sequential manner so that the lamp transitions from its start, to its glow, and then to its run mode. Similarly, it is desired that these voltage and current conditions be automatically provided if the lamp reverts from its run mode to its glow or start mode.

The current developed by the ballast circuit which flows through the gas discharge lamp may typically experience surges as these lamps enter or revert from its modes of operation, for example, as the lamp ionizes and enters into the glow mode, the current flowing at this entrance is of a relatively large value and is of a relatively high rate of change which may be such so as to detrimentally affect the associated circuit components of ballast circuit and especially the lamp itself. It is desired that a ballast circuit be provided with means to limit the maximum amount of current supplied to the lamp during its modes of operation and also to limit the related maximum rate of change of the current.

Ballast circuits commonly comprise impedance devices that are utilized for supplying the necessary conditions for operating a gas discharge lamp. These impedance devices in ballast circuit operated from a typical AC power source create an undesirable condition with regard to lowering the related power factor which, in turn, causes a leading or lagging current relative to the AC power source. The resulting low power factor becomes a concern to the lighting installation designers who must size the conductors and to the electric power companies who must provide the additional reactive power. It is desired that a ballast circuit be provided with means that are easily adapted to present a high power factor to a power source of not less than 0.90. It is especially desired to present this high power factor during the steady-state or run mode of the lamp.

Accordingly, it is an object of the present invention to provide a ballast circuit having means for easily adapting and presenting a high power factor to the AC power source supplying the gas discharge lamp.

It is a further object of the present invention to provide a ballast circuit that presents the desired current and voltage conditions to the gas discharge lamp, in an automatic manner, so that the lamp is allowed to transition to or revert from its start, glow or run modes of operation while still yielding proper lamp performance.

It is a further object of the present invention to provide a ballast circuit having means that limits the amount of current and the rate-of-change of the current supplied to the lamp during its start, glow and run modes of operation.

SUMMARY OF THE INVENTION

In accordance with the present invention, a ballast circuit is provided for operating a gas discharge lamp from an AC source by supplying, automatically and sequentially, DC excitation during the start, glow and run modes of operation.

The ballast circuit comprises an input filter stage, a AC to DC converter, and an oscillator having an electronic switching device with predetermined breakdown characteristics. The input filter stage comprises capacitors and an inductor with one of the capacitors having an impedance value selected to present a relatively high power factor to the AC power source especially during the run mode of operation of the lamp. The AC to DC converter has an output stage whose DC voltage is dependent upon the impedance value of the gas discharge lamp during its start, glow and run modes of operation. The oscillator is connected to the output stage of the AC to DC converter and has an output stage comprised of components including a first inductor as a means of coupling the oscillator output to the lamp with the other components controlling the frequency of operation. The breakdown characteristic of the switching means of the oscillator is selected such that the switching means is (1) rendered conductive when the DC voltage at the output stage corresponds to the impedance value of the gas discharge lamp during its starting mode, and (2) maintained non-conductive condition when the DC voltage at the output stage of the AC to DC converter corresponds to the impedance value of the gas discharge lamp during its run mode of operation.

The subject matter which is regarded as the invention is particularly pointed out and distinctively claimed in the concluding portion of the specification. The invention, however, along with the method of operation and together with further objects and advantages thereof may best be understood by reference to the following description taken in conjunction with the accompanying drawings.

DETAILED DESCRIPTION OF THE PREFERRED EMBODIMENT

Figure 1:
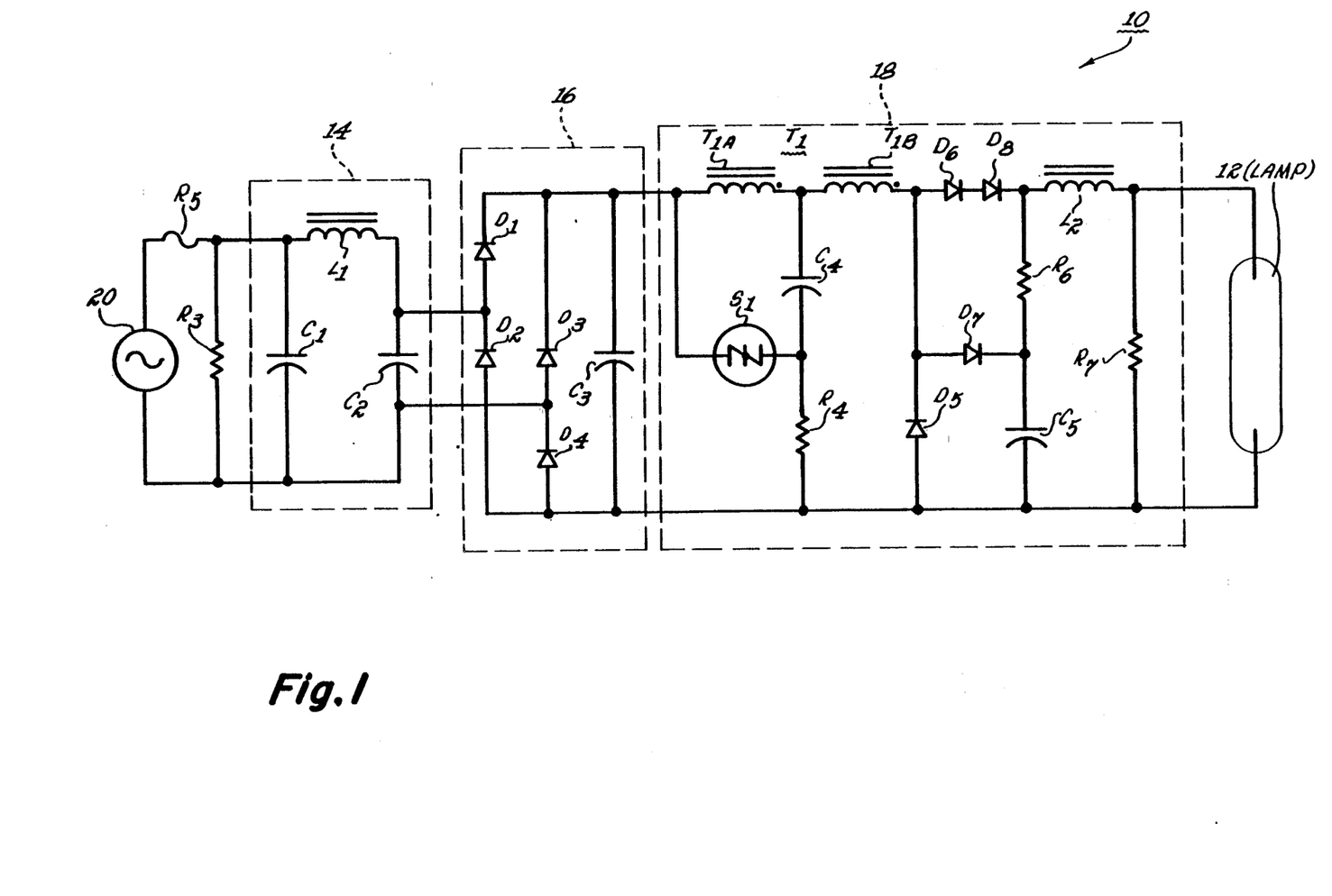
FIG. 1 is a schematic of the ballast circuit in accordance with the present invention.

FIG. 1 illustrates a schematic of a ballast circuit 10 for operating a gas discharge lamp 12. The gas discharge lamp 12 may be of the high efficient metal halide type described in U.S. Pat. No. 4,161,672 of D. M. Cap and Lake issued July 17, 1979 or any DC operating lamp which exhibits a gaseous discharge. The ballast circuit 10 comprises an input filter stage 14, a AC to DC converter 16, and a starting circuit 18. The ballast circuit 10 may receive its excitation from a typical AC power source 20 having a voltage of about 120 volts AC and a frequency of 60 Hz. Other power sources 20 may find application to the present invention such as those found in Japan and European countries.

The ballast circuit 10 comprises a plurality of the conventional elements of the type indicated or having typical components value both as given in Table 1.

TABLE 1

| Element | Value or Type |
|---|---|
| $C_1$ | 1.5 |
| $C_2$ | 4.0 |
| $C_3$ | 1.2 |
| $C_4$ | 0.15 |
| $C_5$ | 0.022 |
| $L_1$ | 0.95 henries |
| $L_2$ | 100 microhenries |
| $R_3$ | 1M |
| $R_4$ | 12K |
| $R_5$ | 1 |
| $R_6$ | 10K |
| $R_7$ | 10M |
| $S_1$ | sidac |
| $D_1$-$D_4$ | IN4007 |
| $D_5$ and $D_7$ | Sanken RC2 (fast recovery 2KV) |
| $D_6$ and $D_8$ | GP10N (fast recovery 1.1KV) |
| $T_1$ | Tapped inductor |

The ballast circuit 10 operates the discharge lamp 12 by the application of various levels of DC excitation during its start, glow and run modes. The type and values of the circuit components of the present invention given in Table 1 of the ballast circuit 10 are selected so as to automatically and sequentially provide desired transfer functions of the circuit 10 that are determined and interrelated to the impedance values of the lamp occurring during its start, glow and run modes. The ballast circuit 10 automatically provides these functions for the lamp as it transitions into or reverts from its start, glow and run modes of operation.

The ballast circuit 10 related to the present invention provides DC excitation to the lamp 12 which includes the necessary voltages and current conditions so as to transition the gas discharge lamp 12 from its (1) initial state requiring a high applied voltage of about a 1 KV to cause an initial break down of the gas discharge lamp, which causes the lamp to (2) enter its positive resistance region commonly referred to as its glow mode that requires a compliance or glow voltage of about 300 volts, and then transitions the lamp to (3) its final arc or run mode. The high voltage 1 KV is applied and then reapplied until the lamp obtains its start condition. As will be discussed, the starting signal developed by the starting circuit of the present invention improves or aids in the starting of the discharge lamp relative to prior methods. Once the break down or start mode is completed, the lamp goes into and completes its glow mode, and then it sequences into its run mode.

Once the lamp reaches its run mode, the DC voltage applied to the lamp changes from the compliance or glow voltage of about 300 volts to about 30 volts and then slowly rises to about 90 volts during the run mode. Once the arc condition during the run mode of the lamp has been established and the temperature has reached its steady state value, the lamp has obtained its run or steady state condition and the ballast circuit 10 allows for the maintenance of such.

The input filter stage 14 of ballast 10 of FIG. 1 is arranged across the power source 20 in a $\pi$ type and comprises capacitors C1 and C2 and an inductor L1. As will be explained in more detail hereinafter with reference to FIG. 6, one of the capacitors C1 has an impedance value selected so as to cause the ballast circuit 10 to present a relatively high power factor to the AC source 20 during the run mode of the lamp 12. The components L1 and C2 form an LC circuit whose undampened resonant frequency is about 80 Hz. This LC circuit amplifies the 120 volts 60 cycle signal from the power source 20 to approximately 300 volts which is applied to the AC to DC converter 16. The AC to DC converter 16 is comprised of diodes D1 through D4 arranged as a full wave rectifier which provides DC output voltage that is preferably filtered by capacitor C3.

The DC voltage at the output stage of the AC to DC converter 16 is dependent or determined by the impedance value $R_T$ of the gas discharge lamp which sequences in a downward manner during the start, glow and run modes and may be further discussed with reference to FIG. 2.

Figure 2:
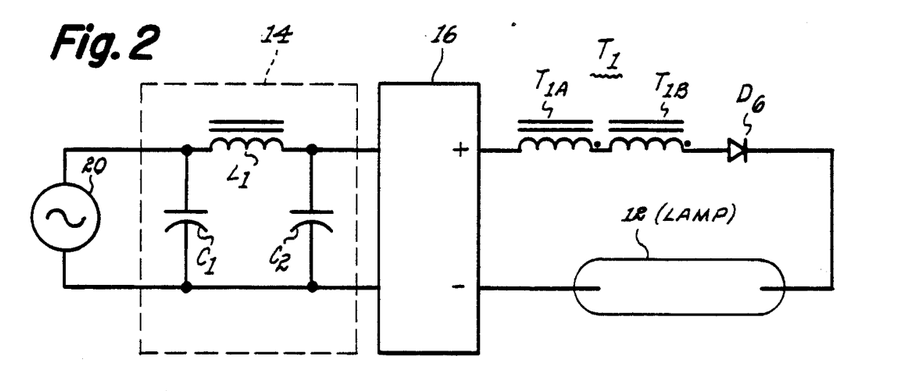
FIG. 2 illustrates the primary components of the ballast circuit associated with the run mode of operation of the gas discharge lamp.

FIG. 2 shows the components of FIG. 1 that are effective as to a first order approximation, that is with 10%, of the circuit during the run mode. FIG. 2 represents an intermediate illustration in the establishment of the equivalent circuit related to the run mode. By first assuming a lamp resistance of $R_T$, one can transform the lamp impedance to the bridge converter by realizing that the current flowing to the lamp, and therefore the current flowing in inductor $T_1$, is continuous. $T_1$ is shown as comprising two windings $T_{1A}$ and $T_{1B}$ which act as two mutually coupled inductors. As shown in FIG. 2, the transformer $T_1$ merely operates as an inductor to filter the AC component of the rectified current. Based upon this assumption of $R_T$ and this filtering condition of $T_1$, the equivalent circuit of the run circuit may be as shown in FIG. 3.

Figure 3:
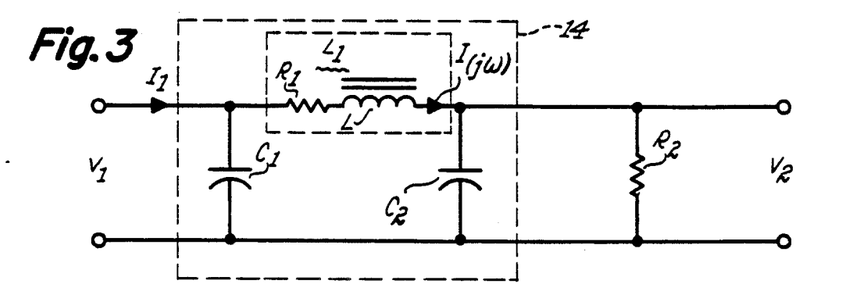
FIG. 3 illustrates the equivalent circuit of the ballast circuit during the run mode of operation along with expressions (3) and (4) applicable thereto.

FIG. 3 is similar to FIG. 2 in that it illustrates the input stage 14 but is different thereto in that it shows $L_1$ as comprised of a series resistance $R_1$ and an inductance L. FIG. 3 represents the equivalent circuit related to the run mode and also illustrates expressions (1) and (2) related to the transfer function of circuit 10, to be described, associated with the run mode of operation. FIG. 3 illustrates the equivalent circuit in a two-port network manner. The input voltage to the network is termed $V_1$ and corresponds to power source 20, and the output voltage to the network is termed $V_2$. $V_2$ is an AC voltage corresponding to the reflected lamp voltage capable of being measured across $C_2$. The current flowing through $L_1$ and $R_1$ is termed I. The current I, shown in FIG. 3, may be represented by expression (1) as:

$$I = I_1 - I_{C1} \quad (1)$$

where $I_1$ is the current flowing from the source $V_1$ and $I_{C1}$ is the current flowing through capacitor $C_1$.

The current I may be further represented by expression (2) as:

$$I(j\omega) = I_1(j\omega) - j(V_1 \omega C_1) \quad (2)$$

where $\omega$ is the frequency of $V_1$ and
$= 2\pi \cdot 60 = 377$ radians/second.

The resistance across the $V_2$ is termed $R_2$ which is substantially greater than the series resistance $R_1$ and has a value represented by expression (3) shown on FIG. 3.

The condition of the currents and voltages shown in the equivalent circuit of FIG. 3 is expressed by the transfer function $G_1$ shown in expression (4) of FIG. 3. The transfer function $G_1$ of expression (4) is represented in terms of (1) damping factor $\epsilon$, (4) the frequency ($\omega$) of $V_1$ in radians/second, (3) the natural frequency ($\omega_n$) of the filter 14 in radians/second and in terms of the (4) resistor, capacitor and inductor components shown FIG. 3. The transfer function of expression (4) illustrates that the circuit composed of $L_1$ and $C_2$ responds to any and all load demands, as mandated by the lamp characteristics, to establish the proper voltage and current for the lamp during the three modes of operation, start, glow and run. The transfer function of expression (4) is plotted in FIG. 4 with the damping factor being the implicit variable.

Figure 4:
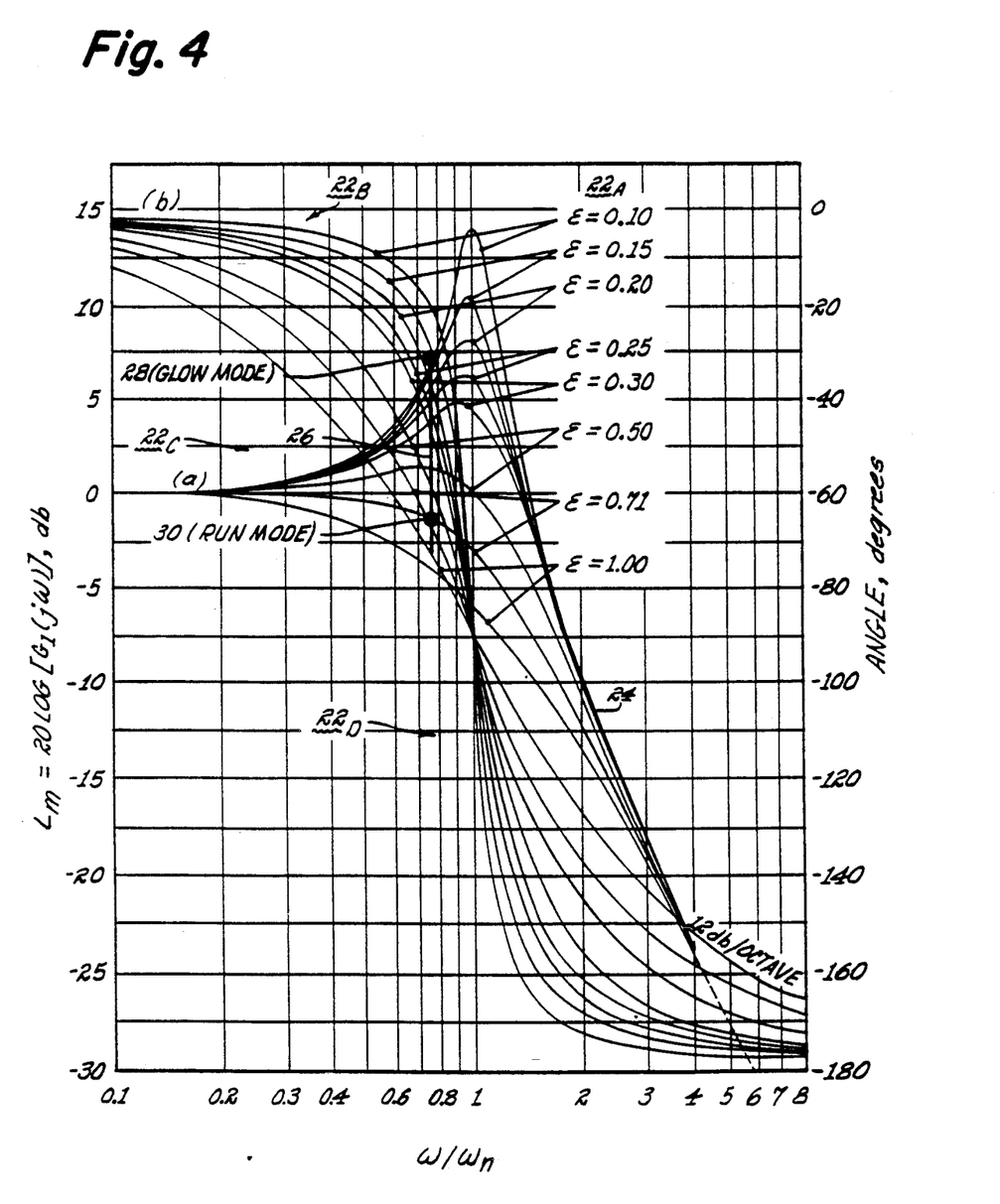
FIG. 4 illustrates a family of characteristic curves related to the ballast circuit of the present invention.

FIG. 4 has an X coordinate represented of the quantity $\omega/\omega_n$ from 0.1 to 8.0 shown by the $\log_{10}$ grids. FIG. 4 has two Y coordinates with the first one representing a dependent variable $L_m$ meaning "log magnitude" and expressed as $L_m = 20 \log G_1 (j\omega)$. The first quantity $L_m$ is measured in decibels (db). The second Y coordinate represents the phase angle between the source 20 and the reflected lamp voltage as discussed with regard to $R_2$ of FIG. 3 and is given in degrees. The quantity $L_m$ is shown as having a range of $-30$ db to 15 db, whereas, the phase angle is shown as having a 0 degree (in-phase) to $-180$ degree range.

FIG. 4 shows a plot of a family of characteristic curves having damping factors with values shown as being grouped under $22_A$ of 0.10, 0.15, 0.20, 0.25, 0.30, 0.50, 0.71, and 1.00. These values $22_A$ are interrelated to (1) an upper plot of curve portions $22_B$, (2) a central plot of curve portions $22_C$ and (3) a lower plot of curve portions $22_D$. The upper plots $22_B$ and the lower plots $22_D$ are continuous and focus or merge at the intersection of $L_m$ of about $-7.5$ db, a phase angle of $-90°$, and a quantity $\omega/\omega_n$ of 1.0. The 12 db/octave break-point related to the lower merger point of the quantities of $22_A$ is shown in FIG. 4 by reference number 24.

The load trajectory 26 associated with the various operational modes of circuit 10 is superimposed on the family of the characteristic curves primarily related to plot $22_C$ as shown in FIG. 4. The desired operating point for the glow made is shown on the load trajectory by reference number 28, whereas, the desired operating point for the run mode is shown by reference number 30. Operating point 30 lies directly on the plot $22_C$ related to damping factor 0.71 curve, whereas, operating point 28 lies directly on the plot $22_B$ related to damping factor 0.10. Over a period of time, as the lamp 12 ages, the steady-state operating point 30 moves (travel) on the vertical load trajectory line 26. For example, the operating point moves from a damping factor curve 0.71 upward toward a damping factor curve of 0.5. Further, as the power source 20 represented in FIG. 3 as $V_1$ changes, the operating point 30 similarly move either above or below the operating point 30 of that shown in FIG. 4. It is desired that the operating point 30 of the run mode not fall below the 0.5 damping factor value.

Figure 5:
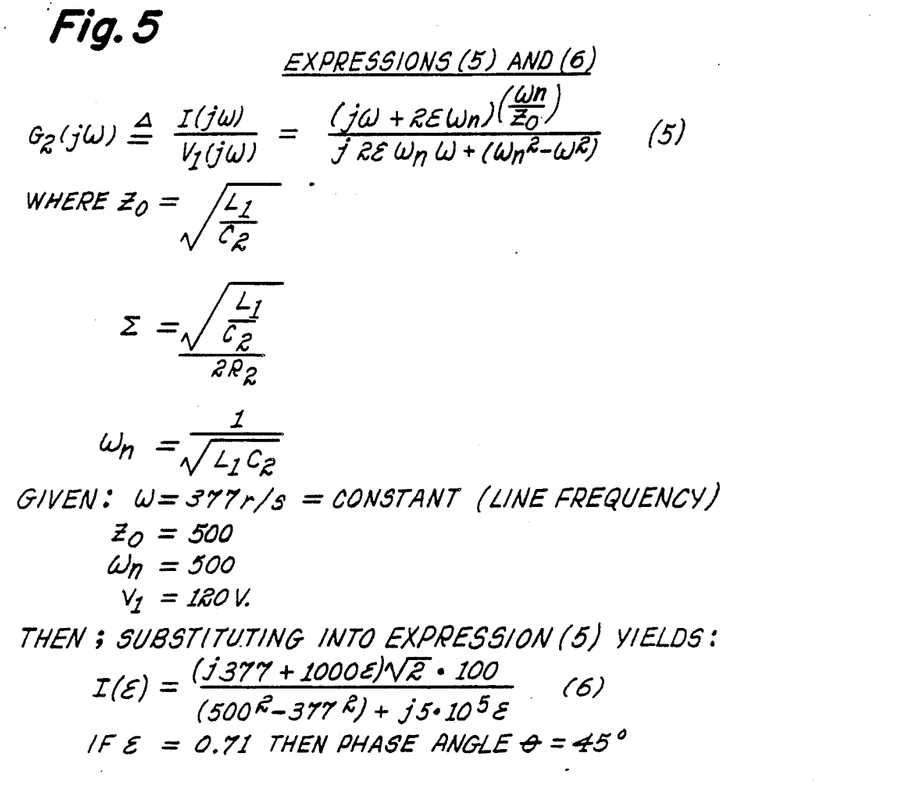
FIG. 5 shows expressions (5) and (6) associated with the current and voltage conditions related to the equivalent circuit of FIG. 3.

The operation of the ballast circuit 10 during the run mode of the gas discharge lamp 12 may be further described with reference to FIG. 5 showing expression (5) and (6) both related to transfer function $G_2$ representative of the input of the circuit of FIG. 3 as it may appear to the applied voltage $V_1$. The transfer function $G_2$ illustrates that when the run circuit is loaded by the lamp, the circuit reacts in such a way as to establish a current whose phase angle with respect to the power line voltage is easily corrected by a single reactive component $C_1$ in a manner to be described. The terms in expressions (5) and (6) are the same as those described with regard to expressions (3) and (4) except for the addition of $Z_o$ which is the characteristic impedance of the filter 14 expressed in terms of $L_1$ and $C_2$. It should be noted that $C_1$ is lacking in and of the terms of expressions (3) and (4). The void of $C_1$ is intended so as to describe the background for the effect of $C_1$ in the easily obtainable desired power factor.

Assuming the values of the quantities for $\omega$, $Z_o$, $\omega_n$ and $V_1$ shown as being related to expression (5), and then substituting these values and quantities into expression (5) yields the values shown in expression (6) for I ($\epsilon$). Further assuming a damping factor of 0.71 for the run mode, then using these quantities of expression (6) yields a phase angle of 45°. Assuming this 45° phase angle during the run mode, then it becomes known that the current lags the applied voltage across lamp 12 by 45°, which then yields a power factor that is undesired for the operation of a gas discharge lamp especially when such operation desires constant power to be applied and maintained across the lamp 12. The phase angle of the input current to the ballast circuit having the equivalent circuit of FIG. 3 as a function of damping factor and without the benefits of $C_1$ of FIG. 3 is shown in FIG. 6.

Figure 6:
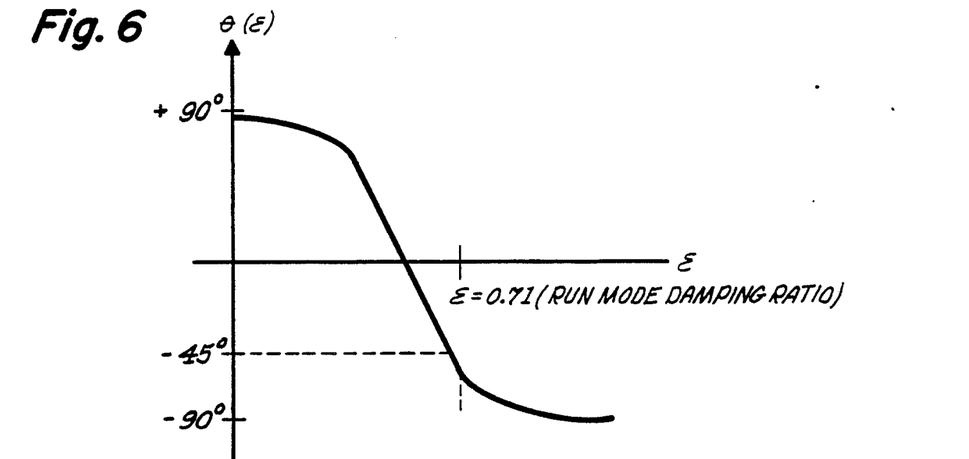
FIG. 6 illustrates the phase angle of uncorrected input current vs. damping ratio.

FIG. 6 has a Y coordinate showing the phase angle $\Theta$ ($\epsilon$) between I and $V_1$ having a peak of about a positive $+90°$ and a valley of about a $-90°$. FIG. 6 also has a X coordinate representative of the damping factor $\epsilon$ and showing the previously discussed, with regard to FIG. 4, damping factor quantity 0.71 related to the run mode of ballast 10. FIG. 6 shows the intersection of the damping factor of 0.71 as corresponding to an angle of $-45°$. This phase angle of $-45$ is corrected by the present invention by providing a nearly unity power factor caused by the selection of the value of capacitor $C_1$. For example, for the description previously given above with regard to the input filter 14 having $C_1$, the value of $C_1$ may be selected in the range of 1.5 to 3.0 microfarads. One of the advantages of the input filter 14 having the capacitor $C_1$ is that a desired power factor is easily obtained by the selection of the value of a single capacitive component $C_1$. This easy selectable capacitive method to provide the power factor correction is due in part to the nearly sinusoidal nature of I occurring during the run mode of operation. This method provides a power factor of not less than 0.90.

The values of $C_1$ from 1.5 to 3.0 microfarad are related to a typical 60 Hz power. These desired values change as the frequency of the power sources changes such as to those found in Europe and Japan. Further, if desired, the 3.0 microfarad value may be exceeded so that the phase angle $\Theta$ ($\epsilon$) may become a positive (+) or leading quantity. The ability to select a single component to provide for the desired phase angle $\Theta$ ($\epsilon$) is an important feature of the present invention. The practice of the present invention allows for the designer to first establish the desired amplification needed for the compliance voltage obtained by the selection of the values of $L_1$ and $C_2$. Then the designer may determine the desired transfer functions for the desired run operation of the lamp. Finally the designer may then select a particular value for $C_1$ to provide for the desired power factor.

Prior to the attainment of the run mode of operation, the lamp 12 passes through the glow mode. In the glow mode, the lamp 12 requires about 300 volts DC for its compliance or glow voltage and about 10 milliamps of current in order for the lamp to establish an arc condition to allow it to pass into the run mode. During the glow mode, the ballast 10 accepts the power line voltage which can vary from 108 to 132 volts and amplifies such by the operation of the resonant network $L_1$ and $C_2$. Network 16 of FIG. 1 then rectifies the output of $L_1$-$C_2$ to about 300 volts DC.

Referring to FIG. 4 and moving upward along the load trajectory 26 from operating point 30 toward operating point 28, it is seen that as the damping factor diminishes in value, the output voltage $V_2$ increases indicated by an increased peaking in the central plots $22_C$. A typical value of the lamp resistance is about 30K during the glow mode, and the resistance $R_2$, previously discussed with regard to FIG. 3, is therefore 30K. Substituting this value of 30K for $R_2$ into expressions (5) and (6) of FIG. 5 along with the other quantities given thereon, yield a value of a damping factor $\epsilon$ equal to $8.33 \times 10^{-3}$.

This damping factor of 0.00833 is added to by the residue values components (e.g., $C_4$ and $R_5$) of the start circuit, to be discussed and results in an equivalent damping factor of approximately 0.1. As seen in FIG. 4, this damping factor of 0.1 provides sufficient amplification of 7 db (about 2.4 ) so as to transition the lamp into the run mode.

Figure 7:
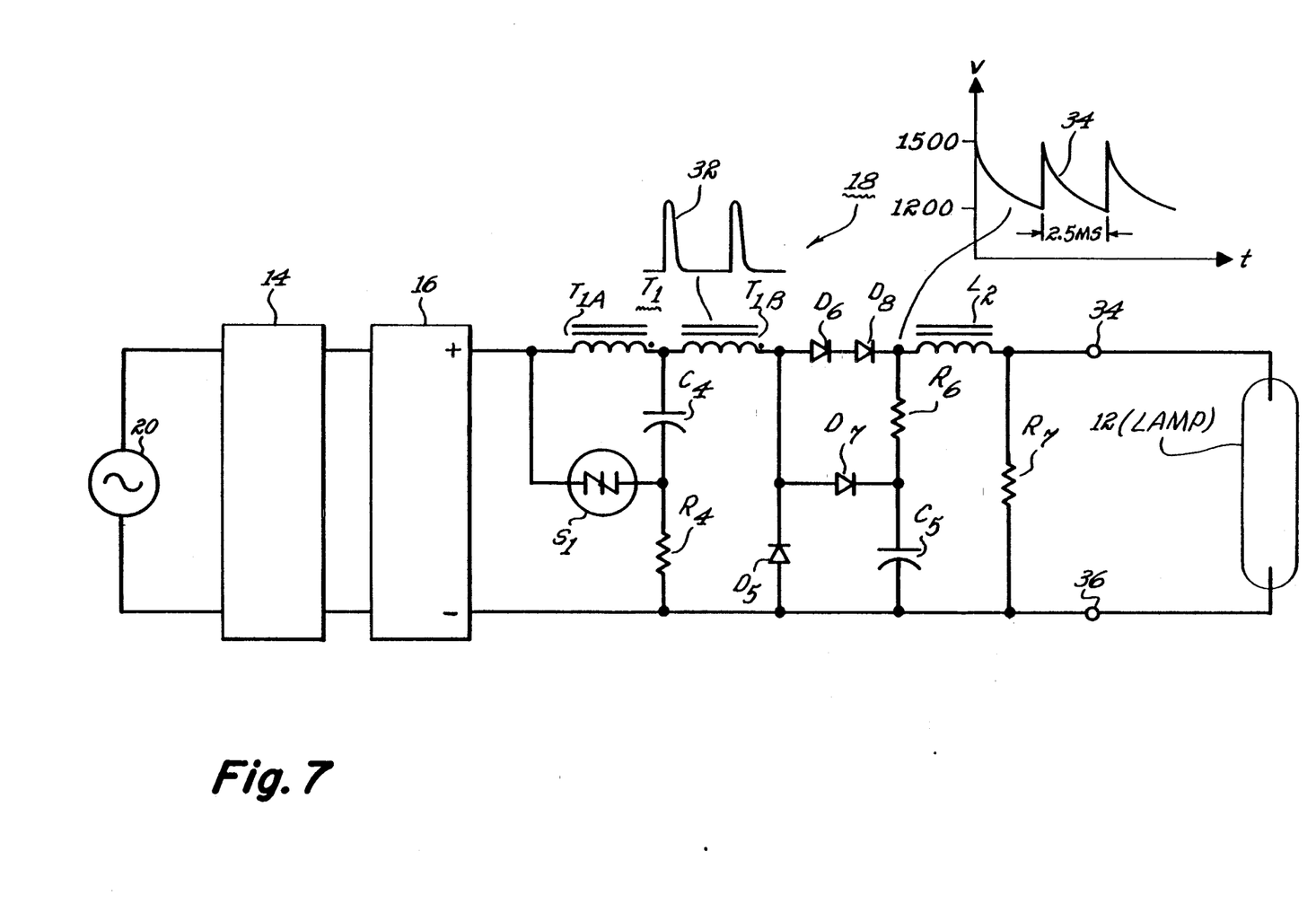
FIG. 7 illustrates the start circuit related to the present invention.

A primary feature of the present invention is that the needed circuitry for the individual modes of lamp operation is segmented and automatically and sequentially provides the desired circuit transfer functions. The glow circuit which is primarily comprised of the elements shown in FIG. 2 (including $C_3$ (not shown) of AC to DC converter 16) is automatically activated if the arc condition occurring during the run mode of the lamp extinguishes for any reason. Similarly, the start circuit is automatically activated whenever the lamp current extinguishes in either the run or glow modes because the sidac $S_1$ of FIG. 1 and 7 is rendered conductive whenever the voltage output of the AC to DC converter is greater than 240 volts which corresponds to the breakdown characteristic of $S_1$. The start circuit that employs the sidac $S_1$ may be further described with reference to FIG. 7.

A primary feature of the starting circuit 18 of FIG. 7 is to develop a relatively high DC voltage level (about 1200 V DC) upon which occurs pulses (about 300 V DC) having a repetition rate of about 2.5 m sec. In general, this signal is developed by an oscillator circuit whose voltage output is amplified by $T_1$, rectified by $D_6$ and $D_8$ and filtered by $C_5$ as a means to produce nearly DC voltage of sufficient amplitude to cause the lamp to conduct. The developed signal provides for better starting of the discharge lamp relative to prior art methods.

The sidac $S_1$ of the start circuit 18 is selected to have breakdown voltage characteristic such that it is; (1) rendered conductive when the DC voltage, for example 300 volts, at the output stage of the converter 16 corresponds the impedance value, such as 500K ohms, of the gas discharge lamp occurring during its starting mode; and (2) is maintained in its non-conductive state when the DC voltages of less than 240 volts and less than about 90 volts correspond to the impedance value of the gas discharge lamp such as 250 $\Omega$ and 30K occurring during the run and glow modes respectively.

When the output of the AC to DC converter 16 exceeds about 240 V DC (typically at about 300 V DC), it excites a 400 Hz relaxation oscillator comprised of $R_4$, $C_4$, $S_1$ and $T_{1A}$ in which the values of $R_4$ and $C_4$ primarily determine the frequency of oscillation. The 300 V DC level causes sidac $S_1$ to be rendered conductive, which, in turn causes capacitor $C_4$ serving as a first energy storage means and having a stored value of about 240 V to discharge into $T_1$ having a mutually coupled winding to establish a high voltage. The operation of $T_1$ having the windings $T_{1A}$ and $T_{1B}$ develops a voltage of about 960 V which is additive with 240 V of $C_4$ and the 300 V of the converter 16 so as to generate a voltage of about 1500 V across $T_1$ which is shown as a pulsed waveform 32 across $T_{1B}$. This 1500 V signal is rectified by diodes $D_6$ and $D_8$ along with diode $D_7$ which directs the 1500 V DC signal to charge a second energy storage device capacitor $C_5$. This signal also appears at the input to $L_2$, via resistor $R_6$ which prevents rapid discharging of $C_5$, and is shown as signal 34.

Signal 34 is shown as a pulse waveform having a peak amplitude of about 1500 V DC which decays to a value of about 1200 V DC. The time constant decay of signal 34 is about 10 m sec. and is determined by the value selected for $C_5$ (0.022 microfarads) and the impedance value (about 500 k) of lamp 12. The signal 34 has a repetition rate of about 2.5 m seconds. The characteristics of signal 34, in particular the high DC level having the pulses extending therefrom, provides for easier starting of the discharge lamp relative to prior methods.

The starting circuit 18 preferably further includes an inductor $L_2$ connected to the arrangement of diodes $D_8$ and $D_6$. The inductor has a value selected, previously given, to limit the amplitude and the rate of change of the current applied to the lamp during the entrance to the glow mode from the start mode. The two diodes $D_8$ and $D_6$ shown in FIG. 7 may be replaced with a single high voltage type diode.

The resistor $R_6$ in addition to providing a path for the development of signal 34 also reduces the susceptibility of the lamp to "back arcing" by increasing the impedance path from the lamp 12 to the capacitor $C_5$. By "back arcing" it is meant that an arc strikes off the back of one of the electrodes of the lamp typically caused by high di/dt conditions experienced by lamp 12. The diode $D_7$ facilitates the charging of $C_5$, which reduces the high voltage ripple to which lamp 12 is subjected. The charging time of $C_5$ is related to $C_5$ and the series resistance of $T_{1B}$.

Still further, it is preferred that a diode $D_5$ be included in the starting circuit and arranged so as to be reversed biased when the switching means $S_1$ is in its non-conductive state. In this arrangement $D_5$ performs a clamping function in that the output of $T_{1B}$ (side attached to $D_5$, $D_6$ and $D_7$) will go negative (voltage) each time the current through sidac $S_1$ is abruptly stopped. The diode $D_5$ clamps this negative voltage and prevents $D_6$ and $D_8$ from being damaged due to excessive reverse voltage.

The inductor $T_1$ of the starting circuit 18 is preferably a tapped inductor and is used instead of a transformer so as to provide a step-up function for the development of signal 34. The usage of the tapped inductor improves the manufacturability of the power circuit and decreases the cost while at the same time improving the efficiency of the high voltage circuit.

Further improvement for the ballast circuit 10 is shown in FIG. 1 with reference to the resistors $R_5$ and $R_3$. The resistor $R_5$ is of a low value and in actuality is a fuse serving as a protection function. The resistor $R_3$ provides a bleeder function to provide a path for the discharging of $C_1$ and $C_2$.

It should now be appreciated that the practice of the present invention provides for the ballast circuit having the desired transfer functions that automatically sequence as the lamp transitions from its (1) start to its (2) glow, and then to its (3) run modes of operation. The desired transfer impedance is automatically obtained during any of the operating modes of the metal halide lamp.

Further, it should be appreciated that the practices of the present invention limits the amplitude and rate-of-change of current surges typically experienced when the lamps related to the present invention enter into the glow mode from the start mode.

Still further it should be appreciated that the practice of the present invention allows for a easily adaptable selection of a single reactive element $C_1$ that provides for a high power factor not less than 0.9 for the ballast circuit 10.

What we claim as new and desire to secure by Letters Patent of the United States is:

1. A power circuit for operating a gas discharge lamp with DC excitation developed from an AC power source, said power circuit generating voltages and currents so as to transition said gas discharge lamp from (1) its initial or starting mode requiring a high voltage so as to cause an initial arcing within the gas discharge lamp; to (2) its glow mode; and then to (3) its final arc or run mode, said gas discharge lamp having a lamp impedance associated therewith which transitions between different values as a function of which mode said gas discharge lamp is operating in, said power circuit comprising:
   (A) an input filter stage arranged in a pi configuration and comprising capacitors (C1 and C2) and an inductor (L1) with one of the capacitors (C1) having an impedance value selected to present a relatively high power factor to said AC power source especially during said run mode of operation, said input filter stage being effective to establish a lamp voltage required for operation of said gas discharge lamp in such glow mode;
   (B) an AC to DC converter having an output stage whose DC voltage is dependent upon said lamp impedance value, said lamp impedance sequencing down in value from said starting, glow, and run modes;
   (C) an oscillator having an electronic switching device (S1) with a predetermined breakdown voltage characteristic, said switching device (S1) connected to said output stage of said AC to DC converter, said oscillator having an output stage with components, including an inductor (T1) with a mutually coupled winding to establish a high voltage, while the other components having values selected to establish the frequency of said oscillator, said breakdown voltage characteristic being selected so that said switching device is: (1) rendered conductive when said DC voltage at said output stage corresponds to said lamp impedance value of said gas discharge lamp during said starting mode, and (2) maintained in its non-conductive state when said DC voltage at said output stage corresponds to the impedance value of said discharge lamp during said run mode.

2. A power circuit according to claim 1 further comprising:
   (A) an inductor (L2) interposed between the output stage of said oscillator and said gas discharge lamp, said inductor (L2) having a value selected to limit the amplitude of and the rate of change of the current applied to said lamp during the entrance from said start mode to said glow mode.

3. A power circuit according to claim 1 further comprising:
   (A) a first energy storage device (C4) connected between said switching device and said inductor $T_1$ and discharging its stored energy into $T_1$ when said switching device is rendered conductive;
   (B) said inductor $T_1$ developing a stepped-up output voltage from said discharge energy of said storage device;
   (C) first means ($D_6$ and $D_8$) for rectifying the output voltage of said inductor $T_1$ so as to develop an output voltage for application to said lamp;
   (D) second means ($D_7$) for rectifying said output voltage of said inductor $T_1$ and directing said output voltage of said inductor $T_1$ to a second energy storage device ($C_5$),
   (E) means ($R_6$) to prevent rapid discharging of said second energy storage device and to interconnect the energy of said second energy storage device to the output voltage of said first means for rectifying the output voltage of said inductor $T_1$ so as to form a starting signal which is applied to said lamp for starting said lamp and having the characteristics of;
   a peak amplitude of about 1500 V DC which decays to a value of 1200 V DC, said decay having a time constant of about 10 m sec., which is determined by the value of said second energy storage device and the impedance of said lamp during said starting, said starting signal having a repetition rate of about 2.5 m seconds.

4. A power circuit according to claim 3 further comprising a diode $D_5$ serving as a voltage clamp and connected across said output stage of said oscillator and arranged to be reversed-biased when said switching means ($S_1$) is in its non-conductive state so as to prevent the breakdown of $D_6$, $D_7$ and $D_8$.

5. A power circuit according to claim 1 wherein said inductor ($T_1$) has a tap and said components of said output stage of said oscillator comprise a series arrangement of a resistor ($R_4$) and capacitor ($C_4$) with one end of said capacitor ($C_4$) being connected to the tap of said inductor ($T_1$) and one end of said resistor ($R_4$) being connected to one end of said lamp, said switching means ($S_1$) having one of its ends connected to the junction between said serially arranged resistor ($R_4$) and capacitor (C$_4$) and its other end connected to the output stage of said AC to DC converter.

6. A power circuit according to claim 1 wherein said filter input stage is arranged with an input capacitor C$_1$ and an output capacitor C$_2$ having interposed therebetween said inductor L$_1$ having a internal resistive value R$_1$, said filter input stage serving as a means to interface the lamp to the power source with a high power factor of not less than 0.90.

7. A power circuit according to claim 6 having an equivalent circuit occurring during said run mode and represented as a two-part network inclusive of said $\pi$ type filter, wherein; (1) the input voltage to the network is termed V$_1$; (2) the output voltage of the network is termed V$_2$; (3) the current flowing through L$_1$ and R$_1$ is termed I, and; (4) a resistance R$_2$ which is substantially greater than said R$_1$ is connected across V$_2$ and has a value represented as;

$$R_2 = \frac{\pi^2}{8} R\tau$$

where R$\tau$ is said lamp impedance value during said run mode.

8. A power circuit according to claim 7 wherein the relation of the input voltage and the output voltage of the network is expressed by the transfer function (G$_1$) of the equivalent circuit as;

$$G_1(j\omega) = \frac{1}{\sqrt{\left(1 - \left(\frac{\omega}{\omega_n}\right)^2\right)^2 + \left(2\epsilon \frac{\omega}{\omega_n}\right)^2}}$$

$$\overset{\Delta}{=} \frac{V_2(j\omega)}{V_1(j\omega)}$$

where $$\omega_n = \frac{1}{\sqrt{L_1 C_2}}$$

$\omega$ = frequency of the power source (times) $2\pi$ and is measured in radians/second; and $\epsilon$ is the damping factor and is expressed as;

$$\epsilon \approx \frac{1}{2} \sqrt{\frac{R_1^2}{L_1/C_2} + \frac{L_1/C_2}{R_2^2}}$$

9. A power circuit according to claim 7 wherein the relation of the input voltage V$_1$ and the current I is expressed by the transfer function (G$_2$) of the equivalent circuit as;

$$G_2(j\omega) = \frac{I(j\omega)}{V_1(j\omega)}$$

which may be expressed;

$$G_2(j\omega) = \frac{(j\omega - 2\epsilon \omega_n)\left(\frac{\omega_n}{(Z_0)}\right)}{j 2\epsilon \omega_n \cdot \omega + (\omega_n^2 - \omega^2)}$$

where $$Z_0 = \sqrt{\frac{L_1}{C_2}}$$

$$\epsilon = \sqrt{\frac{L_1/C_2}{2R_2}}$$

$$\omega_n = \frac{1}{\sqrt{L_1 C_2}}$$

$\omega$ = frequency of the power source (times) $2\pi$ and is measured in radians/second.

10. A power circuit according to claim 9 wherein;
$\omega$ = 377 radians/second
Z$_0$ = 500
$\omega_n$ = 500
V$_1$ = 120 volts (AC) and I ($\epsilon$) may be expressed as;

$$I(\epsilon) = \frac{(j 377 + 1000 \epsilon)[\sqrt{2} \cdot (100)]120}{(500^2 - 377^2) + [j5 \cdot 10^5 \epsilon](j2(377)(500)E)}$$

11. A power circuit according to claim 10 wherein;
$\epsilon$ = 0.71
C$_1$ = is in the range from about 1.5 ufd to about 3.0 ufd.
V$_1$ and I are sinusoidal quantities.

* * * * *